3,505,253
EXPANDABLE ALKENYL AROMATIC POLYMERS CONTAINING INCORPORATED EXPANDABLE ALKENYL AROMATIC POLYMERS AND POLYSILOXANE
Arnold B. Finestone, 20 Grove Ave.; Michal Niechwiadowicz, 80 Cloverleaf Road; and Hugh C. Crall, 75 Harvard St., all of Leominster, Mass. 01453
No Drawing. Continuation-in-part of application Ser. No. 667,658, Sept. 14, 1967. This application Mar. 12, 1969, Ser. No. 806,703
Int. Cl. C08f 47/10; C08j 1/26
U.S. Cl. 260—2.5                                11 Claims

ABSTRACT OF THE DISCLOSURE

Expandable alkenyl aromatic polymers having a fine, uniform pore size and which can be molded over a wider range without a significant change in product characteristics are prepared by polymerizing one or more alkenyl aromatic monomers in the presence of an expandable alkenyl aromatic polymer and an organically di-substituted polysiloxane.

---

This application is a continuation-in-part of copending application Ser. No. 667,658, filed Sept. 14, 1967, now abandoned.

This invention relates to expandable compositions having utility in various manufactured articles. More particularly it relates to such thermoplastic compositions formed from alkenyl aromatic polymers obtained by polymerizing alkenyl aromatic monomers in the presence of about 0.007 to 0.045% of organically di-substituted polysiloxane and about 1 to 40% of one or more similar expandable polymers, the percentages of polysiloxane and polymer being based on the total weight of the product.

The term alkenyl aromatic polymers includes thermoplastic polymers and copolymers containing in chemically combined form at least 55% by weight of a monoalkenyl aromatic compound having the general formula:

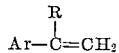

wherein Ar represents a monovalent aromatic radical and R represents hydrogen or the methyl radical. Examples of such alkenyl aromatic resins are the solid homopolymers of styrene, Ar-vinyl toluene, Ar-vinyl xylene, and Ar-ethyl vinyl benzene; the solid copolymers of two or more of such alkenyl aromatic compounds with a minor amount of other polymerizable olefinic compounds, and the like known polymeric materials.

Polystyrene containing pentane or the like is used in making molded articles and in the preparation of expanded cellular insulation, but for many uses it has the disadvantage of requiring a narrow range of molding conditions, giving coarse or non-uniform pre-puff cell size, or having crystallinity, or combinations thereof. Attempts to produce such compositions without these disadvantages have resulted in an undesirable decrease in important properties of the polymer, such as poor shelf-life, lumping during pre-expansion, excessive water pick-up and clumping during pre-expansion, coarse and non-uniform cell structure in the pre-puff, and poor molding characteristics (poor fusion, slow setting, long cooling cycle, or collapse or post expansion of the molded article, or combinations thereof).

The foregoing and other disadvantages are obviated by the present invention, an object of which is to provide new, expandable styrene polymer materials, which give a pre-puff of fine and uniform cell size which is free from crystallinity and which can be molded over a wider steam pressure range without adversely affecting the product characteristics. A further object of the invention is to provide a process by means of which such styrene polymer materials can be prepared in a convenient way. Other objects of the invention will be obvious in view of details or embodiments of the invention as set forth hereinafter.

These objects are achieved by providing styrene polymers or the like having 1 to 40% of similar expandable polymer dissolved in the monomer either prior to or during the polymerization thereof, and also 0.007 to 0.045% of liquid organically di-substituted polysiloxane uniformly dispersed therein, the percentages of similar expandable polymer and organically di-substituted polysiloxane being based on the total weight of the product. It is preferred to add the said expandable polymer in particulate form and said polysiloxane to the monomeric styrene or the like and to polymerize this mixture in accordance with usual suspension polymerization methods. In this way, neither the molecular weight nor the softening range of the styrene or the like polymer material is undesirably altered. It has been found that products having a pore size of about 3 to 5 mils and a molding pressure range of 3 to 5 p.s.i. or more are obtained when practicing the teachings of the present invention.

The following examples illustrate ways in which the principles of the invention are applied, but are not to be construed as limiting its scope. The parts and percentages specified in the examples are parts and percentages by weight, unless otherwise indicated.

EXAMPLE 1

There are charged into a jacketed vessel equipped with an agitator 100 parts of distilled water. The agitation is commenced, the water temperature is raised to 195° F. and 78.975 parts of styrene, 15.000 parts of expandable polystyrene beads, 0.025 part of dimethyl polysiloxane, 0.165 part of benzoyl peroxide and 0.085 part of tertiary butyl peracetate are added thereto. Suspension polymerization type agitation is used and its intensity is such that the diameter of the product particles or beads ranges from 0.25 to 2.5 mm. Then 0.05% of polyvinyl alcohol, based on the weight of the total charge, is added to contents of the reactor as an aqueous solution, and polymerization is carried on at 195° F. When the polymer content in the polymerizing oil phase is about 70%, the reactor is pressurized with nitrogen to 15 p.s.i.g. and pentane (6.75 parts) is added thereto over a period of 10 minutes and polymerization is continued at 195° F. for two hours. Next, the reaction temperature is raised to 240° F. and polymerization is carried on for 5 hours. Lastly, the reactor charge is cooled to below 125° F., thoroughly washed with water and dride.

The following product and process advantages accrue from the use of expandable polystyrene and the polysiloxane:

(a) When pre-expanded, the product gives pre-puffs having very fine and uniform cells in a range of 3 to 4 mils in diameter or equivalent wall to wall dimension, (i.e., discrete pre-expanded particles).

(b) The pre-expanded product can be molded under a wide range of conditions without shrinkage, thermal collapse or poor fusion. For a complicated article of varying thickness and shape and having a 15 in. x 4 in. x ½ in. rib, the operative steam pressure in 22 to 26 p.s.i.g. In other words, the molding pressure range is 4 p.s.i. for a satisfactory product.

(c) The surface of the molded article has high glass which enhances its appearance.

(d) The duration of the polymerization cycle is 11.75 hours compared with 13 hours for a control run.

COMPARATIVE EXAMPLE A

The procedure of Example 1 is repeated as a control run using 92.44 parts of styrene (instead of 78.975), no expandable polystyrene beads, 0.20 part of benzoyl peroxide (instead of 0.165) and 7.25 parts of pentane (instead of 6.75). The amounts of the remaining ingredients are left unchanged.

This example illustrates the character of a product made according to the invention but without the presence, in the monomer, of an expandable polymer. The product is significantly poorer than the product of Example 1. Its cell sizes are relatively large, in the range of 12 to 19 mils, and its molding range is 1.0 to 1.5 p.s.i. steam pressure. Also, the duration of the polymerization cycle is 13 hours, which is markedly longer.

EXAMPLE 2

The procedure of Example 1 is repeated using 0.025 part of methyl octyl polysiloxane instead of 0.025 part of the dimethyl polysiloxane.

The product has all desirable features of the product of Example 1.

EXAMPLE 3

The procedure of Example 1 is repeated using 0.010 part of methyl octyl polysiloxane instead of 0.025 part of dimethyl polysiloxane. The product is very substantially the same as the product of Example 1. Its cell size range is 4 to 5 mils and its molding range is 3 to 3.5 p.s.i. of steam.

EXAMPLE 4

The procedure of Example 1 is repeated using 0.015 part of dimethyl polysiloxane (instead of 0.025 part).

The product has all desirable features of the product of Example 1.

EXAMPLE 5

The procedure of Example 1 is repeated using 0.010 part of dimethyl polysiloxane (instead of 0.025 part).

The product is very substantially the same as the product of Example 1. Its cell size range is 4 to 5 mils and its molding range is 3 to 3.5 p.s.i. of steam.

COMPARATIVE EXAMPLE B

The procedure of Example 1 is repeated using no polysiloxane.

The product is significantly poorer than the product of Example 1. Its molding range is only 2.5 to 3.0 p.s.i. of steam, its cell size range is 5 to 6 mils and the surface gloss of the molded articles is low. This example illustrates the fact that a product having a larger cell size and a narrower molding range is obtained when no polysiloxane is added to the reaction mixture.

EXAMPLE 6

The procedure of Example 1 is repeated using 57.985 parts of styrene (instead of 78.975), 35.00 parts of expandable polystyrene beads (instead of 15.00) and 1.55 parts of benzoyl peroxide (instead of 0.165), and the amounts of the remaining ingredients are unchanged.

The product has all desirable features of the product of Example 1, and the duration of the polymerization cycle is 10 hours compared with 13 hours in the control run.

EXAMPLE 7

The procedure of Example 1 is repeated using 87.702 parts of styrene (instead of 78.975), 5.00 parts of expandable beads (instead of 15.00), 0.188 part of benzoyl peroxide (instead of 0.165) and 7.00 parts of pentane (instead of 6.75). The amounts of the remaining ingredients are left unchanged.

The product has the desirable features of the product of Example 1. Its molding range is 3.0 to 3.5 p.s.i. of steam and the polymerization cycle is 25 minutes shorter than that in the control.

Comparable results to the foregoing are achieved by various modifications thereof, including the following. The present invention is employed to polymerize a charge consisting of at least 55%, and preferably 70 to 100%, of at least one monoalkenyl aromatic monomer compound. Up to 45% of the monomer can be another ethylenically unsaturated compound copolymerizable with the monovinyl aromatic compound. The monovinyl aromatic compound is preferably styrene although vinyl napthalenes, vinyl aryl compounds or their substituted products may also be employed. Examples of substituted vinyl aryl compounds include: halogenated styrenes such as mono- and di-chloro, mono and di-bromo, or fluorostyrenes; alkyl, alkenyl, aryl, aryl-alkyl, alkyl-aryl and cycloaliphatic substituted materials, as for example mono- and dimethyl-styrene, and ethyl-styrene. A combination of monovinyl aromatic compounds can also be employed. The ethylenically unsaturated compound copolymerizable with the mono-vinyl aromatic can include any of a variety of monomers known to be copolymerizable with vinyl aryl compounds. Examples thereof include the esters (preferably the alkyl esters) of acrylic acids, methacrylic acids and itaconic acid, such as ethyl acrylate, methyl methacrylate, and the like, the nitrile derivatives of acrylic and methacrylic acids, e.g., acrylonitrile, methacrylonitrile, and the like, all of which are well known in the art for the purposes of copolymerizing with mono-vinyl aromatic compounds. The polymerization of styrene monomer is preferred.

The amount of added expandable polymer is at least 1%, based on the total weight of the product and 40% is a practical upper limit. However, even higher amounts may be added if efficient agitation or mixing equipment is used. About 5 to 30% is a preferred range. The higher amounts in these ranges are desirable because shorter process cycle times are required therewith.

The expandable bead ingredient may be any thermoplastic alkenyl aromatic polymer of the similar types already discussed. It may be from an identical or a different monomer or monomers of these types. Instead of beads, any convenient particulate form of polymer may be used, e.g., pellets, granules and the like.

The molecular weight is related to the viscosity of a 10% by weight solution of the polymer in toluene at 25° C. Generally, all the useful solid polymers of the alkenyl aromatic types may be made in accordance with the invention. The molecular weights thereof may be in the range of 25,000 up to 500,000 or an even wider range.

In a preferred modification of the invention the expandable polymer ingredient is of a toluene solution viscosity within 5 centipoises of the solution viscosity of the ultimate product. This enables better product quality control on a commercial basis. A viscosity within 5 centipoises indicates that the molecular weight of the added polymer is substantially identical with that of the final product.

Generally, its particle size should be in the range of 0.05 to 10.0 mm. average diameter. Larger size particles may be used, especially with efficient mixing equipment, but are not indicated for economic and quality control reasons. Even very fine particles are suitable; e.g., of the size of dust or the like.

Preferably, the expandable polymer ingredient should be capable of expansion to about 50 times its original volume (in air). However, partially expanded material which is still further expandable may be used. From the processing and handling viewpoint, the rather low density expandable material is less desirable than the denser material.

A critical feature of the invention is that the added polymer is expandable when added. For process advantage, it should expand under the reaction conditions, e.g., when it is added, or if in a cold reaction mixture, when the temperature thereof is raised sufficiently. Generally, such expansion occurs at some point or stage of the reaction procedure. Addition of the expandable polymer to hot reaction mixture is preferred from the process viewpoint, especially the ensuing shorter reaction time.

The amount of organically di-substituted polysiloxane added should be at least 0.007% and preferably at least 0.01% based on the total weight of the oil-phase charge and the upper limit is 0.045% and preferably 0.04%. Higher amounts deleteriously affect the quality of the product, and lower amounts do not give the desired improvements.

Preferably, the polysiloxane is added to the monomer, or to a mixture of monomer and water prior to addition of suspending agent for suspension polymerization.

The organically di-substituted polysiloxanes useable in the present invention are those derived from compounds having the formula $R_1R_2SiO$, wherein $R_1$ and $R_2$ may be the same or different saturated aliphatic or cyclic hydrocarbon radicals selected from the class consisting of alkyl groups having 1 to 22 carbon atoms, aryl groups such as the phenyl radical, alicyclic groups such as the cyclohexyl radical, aralkyl groups, such as the benzyl radical and alkaryl groups, such as the tolyl radical. The most available polysiloxanes are those containing saturated aliphatic radicals, the phenyl radical and the cyclohexyl radical. For best performance the polysiloxanes should contain di-alkyl siloxane and preferably at least 75% of the total substituents are methyl groups.

The polysiloxanes used are normally liquid silicone fluids such as are readily available on the open market. They may be in the form of pure liquids or as solutions in organic solvents which are poor solvents for the alkenyl aromatic polymer or as aqueous emulsions of the same.

In a preferred modification, the process is initiated by dispersing in water a solution of the dialkyl polysiloxane and expandable polymer in monomer with the initial stages of the polymerization being conducted at temperatures under 100° C. preferably temperatures within the range of 70° to 95° C. It is preferred to employ polyvinyl alcohol as the suspending agent, although other conventional suspending agents can be employed, such as tricalcium phosphate or other difficultly soluble phosphates, calcium carbonate, carboxymethyl cellulose, hydroxyethyl cellulose, polyvinyl-pyrolidone aluminum oxide, magnesium silicate, and the like, all of which are well known for this purpose. It is preferred to add the suspending agent on a delayed basis, i.e., where the polymer content has reached about 20 to 55%, which normally may be up to about 5 hours after the reaction mixture reaches the desired polymerization temperature, e.g., ordinarily about 70° to 95° C. If enough expandable polymer is added to give the desired polymer content, the suspending agent is added promptly thereafter. The pH of the reaction mixture may be varied depending on the suspending agent employed, e.g., pH of 5 or greater for tricalcium phosphate. When 50 to 80%, preferably 60 to 75% conversion has been obtained, the volatile liquid blowing agent is added rapidly to the reaction system in a period of 2 to 30, preferably 5 to 20 minutes.

Suitable volatile liquid blowing agents generally having boiling points of from about 15 to approximately 100° C. are employed. Such agents are well known in the art. "Petroleum ethers" are particularly preferred, with those boiling within the range of 35° to 65° C. conventionally known as the "pentane" fraction being especially suitable. Such a fraction generally contains at least 70% normal pentane. Petroleum ethers boiling in the range of 65° to 72° C. denoted as the "hexane" fraction and those boiling in the range of 95° to 100° C. denoted as the "heptane" fraction, may also be used. Similarly useful are pure hydrocarbons boiling in the range of 15° to 100° C., such as for example, pentane, hexane, heptane, cyclopentane, and the like, or mixtures of such hydrocarbons as occurs in the petroleum ether fractions.

The volatile organic compound can be a liquid or gas at ordinary temperatures and pressures, i.e., at atmospheric conditions. The compound should be a nonsolvent or poor solvent of the polymer. It should have a molecular weight of at least 56 or greater and a molecular size such that it does not readily diffuse from the solid polymer.

The product generally has 3 to 10, preferably 4 to 8% of the volatile blowing agent incorporated therein. The quantity of blowing agent can be varied and is sufficient to cause the desired degree of expansion by the end users. Since there is generally little loss of volatile blowing agent, the amount of blowing agent added is about 3 to 10 weight percent of the monomer employed.

Just prior to the addition of the volatile liquid blowing agent, the reactor may be pre-pressured with an inert and non-condensable gas to insure avoidance of undesired porosity or voids in the polymer particles. Alternatively this pressurization may be effected immediately after the addition of the volatile liquid blowing agent and before the bulk of the blowing agent has been absorbed by the polymer beads.

Thereafter the second stage of the polymerization is effected at temperatures of about 95° C. or above, desirably in the range of 95° to 145° C. especially 95° to 140° C.

As is conventional, a catalyst or initiator is added to promote the first stage polymerization. Typical examples of such initiators are benzoyl peroxide and its derivatives, such as para-chlorobenzoyl peroxide, and the like. To help catalyze the second stage of the polymerization further amounts of peroxide catalysts may be added to the polymerization zone. The second stage catalyst may be added at the beginning or at the latter part of the first stage polymerization, and preferably the peroxide catalyst is added along with the blowing agent, especially if the catalyst is soluble in the blowing agent. If the initiator is benzoyl peroxide or a similar initiator which readily reacts at temperatures under 100° C., the initiator for the second stage of polymerization must be added at or about the beginning of the second stage for catalysis of the second stage polymerization to be effective.

However, in another embodiment of the present invention, a second catalyst having a half-life value considerably higher than that of benzoyl peroxide can be used to promote the second stage reaction. In this embodiment, the second stage catalyst has a half-life value of more than one hour at 100° C. in benzene (preferably about 3 hours, in contrast to the 0.4 hour half-life value of benzoyl peroxide at 100° C. in benzene). In this embodiment the catalyst can beadded at the beginning of polymerization or prior to the second stage reaction, since it will not substantially decompose at temperatures of 80° to 95° C. as used in the first stage polymerization, but will only exercise its catalytic effect at the higher temperatures (which characterized the second stage of polymerization).

Examples of such preferred second stage catalysts are tertiary butyl peracetate, cyclohexanone peroxide, 2,5-dimethyl-2,5-bis(benzoyl peroxy)hexane, di-tertiary butyl peroxide, di-tertiary butyl diperphthalate, methyl ethyl ketone peroxide, dicumyl peroxide, hydroxyheptyl peroxide, and the like.

The second stage polymerization which takes place generally at temperatures of 95° C. to 145° C. is conducted to effect virtually 100% complete conversion. After completion of the polymerization, the polymerization mixture is cooled in the reactor so as to preclude premature expansion of the expandable particles upon discharge from the reactor. The products formed in accordance with the present process are polymer beads, capable of expansion upon heating with steam, or the like. The beads may then be removed from the polymerization mixture, washed thoroughly, and dried following conventional processing techniques. The product may be of any usual bead type or the like as to particle size. A suitable range is 0.25 to 2.5 mm. average diameter.

Where all the advantages of the invention are not required, alternative polymerization procedures may be used, as known in the art, including bulk polymerization with simultaneous addition of diorgano polysiloxane and with simultaneous or supplemental addition of blowing agent, and comminution of any solid material as desired, in known manner. This applies equally to the preparation of expandable polymer for addition to a polymerization charge. In a sequential batch operation, a part of the product of one batch may be used or recycled as the expandable ingredient for the next batch.

In general the first stage polymerization conducted at temperatures of less than 100° C. is effected for periods of 2 to 10 hours, depending upon catalyst, to obtain 50 to 90% conversion. The second stage polymerization is preferably conducted at temperatures above about 95° C. to complete the polymerization after addition of the volatile liquid blowing agent, and is generally effected over a period of 1 to 10, preferably 3 to 5 hours, as required.

If desired, general self-extinguishing agents, anti-coalescing agents and the like may be included. A desirable self-extinguishing agent is tetrabromobutane. For best results, 0.6 to 0.9% is used based on the weight of the polymer in the final composition. A wider range of 0.4 to 2.0% is usable, especially with the higher proportions of blowing agent; and 0.5 to 1.5% is a practical range for use with a median concentration of blowing agent.

That anti-coalescing agents are characterized in that they do not have a deleterious affect on the expanded resin particles or the final product. Examples of such anti-coalescing agents are magnesium stearate, zinc stearate, calcium stearate, sodium stearate, aluminum stearate, butyl stearate, stearic acid, sodium oleate, talc, tricalcium phosphate, potassium lauryl sulfate, diatomaceous earth, and combinations of two or more thereof.

Polymerization of the monomers can be effected in the presence of various other agents to provide an ultimate polymer product containing such an agent or agents. Examples of such other agents include dyes, plasticizers and the like.

Having described the present invention, that which is sought to be protected is set forth in the following claims.

We claim:
1. A process for preparing an expandable alkenyl aromatic polymeric composition comprising polymerizing an alkenyl aromatic monomer having distributed therein about 1 to 40% of an expandable alkenyl aromatic polymer and 0.007 to 0.045% of organically di-substituted polysiloxane derived from compounds having the Formula $R_1R_2SiO$ wherein $R_1$ and $R_2$ may be the same or different hydrocarbon groups selected from the class consisting of alkyl radicals having 1 to 22 carbon atoms, alicyclic radicals, aromatic radicals, alkaryl radicals, aralkyl radicals, and mixtures of these and introducing about 3 to 10% of volatile blowing agent into the reaction mixture at any stage of the polymerization, said percentages being based on the weight of the product.

2. The process of claim 1 wherein $R_1$ and $R_2$ are selected from the group consisting of alkyl radicals having 1 to 22 carbon atoms, the phenyl radical and mixtures of these and at least 75% of the total substituents are methyl groups.

3. The process of claim 1 wherein the polysiloxane is a methyl alkyl polysiloxane and it is present in an amount of about 0.01 to 0.04%.

4. The process of claim 3 wherein said monomer is styrene and it is polymerized to substantially the same molecular weight as the added expandable polymer.

5. The process of claim 1 carried out in aqueous suspension.

6. The process of claim 5 wherein the polysiloxane is added with the monomer, and a suspending agent is first added when the reaction mixture contains at least 20% polymer.

7. The process of claim 3 wherein the polysiloxane is added with the monomer, and expandable polymer is first added when at least 15% of the monomer has been converted to polymer.

8. The process of claim 7 carried out in two stages wherein first stage and second stage catalysts are added initially.

9. A process for preparing expandable polystyrene compositions comprising polymerizing styrene having distributed therein about 1 to 40% expandable polystyrene and 0.01 to 0.04% methyl alkyl polysiloxane wherein the alkyl radical may have from 1 to 22 carbon atoms and at least 50% of the alkyl groups are methyl radicals and introducing about 3 to 10% of volatile blowing agent into the reaction mixture at any stage of the polymerization, said percentages being based on the weight of the product.

10. An expandable alkenyl aromatic polymeric composition comprising about 3 to 10% by weight of volatile blowing agent; about 0.007 to 0.045% by weight of an organic di-substituted polysiloxane derived from compounds having the Formula $R_1R_2SiO$ wherein $R_1$ and $R_2$ may be the same or different hydrocarbon groups selected from the class consisting of alkyls having 1 to 22 carbon atoms, alicyclic radicals, aromatic radicals, alkaryl radicals, aralkyl radicals, and mixtures of these; a first expandable alkenyl aromatic polymer and a second expandable alkenyl aromatic polymer, said second polymer having been polymerized in the presence of said first polymer.

11. The product of claim 10 wherein said organic di-substituted polysiloxane is a methyl alkyl polysiloxane, the alkyl radical of which contains 1 to 22 carbon atoms, and which is present in an amount of about 0.01 to 0.04% by weight.

References Cited

UNITED STATES PATENTS

| | | |
|---|---|---|
| 3,060,138 | 10/1962 | Wright. |
| 3,086,885 | 4/1963 | Jahn. |
| 3,224,984 | 12/1965 | Roper et al. |
| 3,359,219 | 12/1967 | Ingram et al. |

MURRAY TILLMAN, Primary Examiner

M. FOELAK, Assistant Examiner

U.S. Cl. X.R.

260—827, 41, 23